US009744621B2

(12) United States Patent
Aubry

(10) Patent No.: US 9,744,621 B2
(45) Date of Patent: Aug. 29, 2017

(54) METHOD FOR CUTTING PIECES FROM A STRIP OF MATERIAL AND CUTTING MACHINE FOR CARRYING OUT SAID METHOD

(71) Applicant: DIMECO ALIPRESSE SAS, Pirey (FR)

(72) Inventor: Marc Aubry, Pouilley les Vignes (FR)

(73) Assignee: DIMECO SAS, Pirey (FR)

( * ) Notice: Subject to any disclaimer, the term of this patent is extended or adjusted under 35 U.S.C. 154(b) by 149 days.

(21) Appl. No.: 14/763,639

(22) PCT Filed: Feb. 11, 2014

(86) PCT No.: PCT/IB2014/000145
§ 371 (c)(1),
(2) Date: Jul. 27, 2015

(87) PCT Pub. No.: WO2014/122524
PCT Pub. Date: Aug. 14, 2014

(65) Prior Publication Data
US 2015/0360318 A1 Dec. 17, 2015

(30) Foreign Application Priority Data
Feb. 11, 2013 (FR) ..................................... 13 51128

(51) Int. Cl.
*B23K 26/08* (2014.01)
*B23K 26/38* (2014.01)
(52) U.S. Cl.
CPC ...... *B23K 26/0846* (2013.01); *B23K 26/0876* (2013.01); *B23K 26/38* (2013.01)
(58) Field of Classification Search
CPC .................................. B23K 26/08; B23K 26/38
(Continued)

(56) References Cited

U.S. PATENT DOCUMENTS 4,568,815 A 2/1986 Kimbara et al.
6,563,081 B2 5/2003 Pace
(Continued)

FOREIGN PATENT DOCUMENTS

EP 1 584 407 A1 10/2005
EP 1 586 407 A1 10/2005
(Continued)

OTHER PUBLICATIONS

International Search Report Corresponding to PCT/IB2014/000145 mailed Jun. 20, 2014.
(Continued)

*Primary Examiner* — Samuel M Heinrich
(74) *Attorney, Agent, or Firm* — Davis & Bujold PLLC; Michael J. Bujold

(57) ABSTRACT

A machine for flatbed cutting of pieces from a strip of material (3) wound in a coil and moving continuously. The cutting zone (ZD) comprises a cutting head (17) supported by a mobile support (20) translatably mounted on a stationary longitudinal beam (18) disposed parallel to the direction of movement (A) of the strip of material. It is coupled to a first actuator (Mx) for moving the cutting head (17) linearly along a longitudinal axis (X) parallel to the beam and comprises a variable-geometry mechanism (21-24) coupled to a second actuator (My) for moving the cutting head (17) linearly along a transverse axis (Y), perpendicular to the longitudinal axis (X). A central control unit (9) controls the actuators to move the cutting head (17) in the cutting zone (ZD) along a path determined by the contour of the pieces (2) to be cut and the speed of the material (3).

14 Claims, 5 Drawing Sheets

(58) Field of Classification Search
USPC .................................... 219/121.67, 121.72
See application file for complete search history.

(56) References Cited

U.S. PATENT DOCUMENTS

| | | | | |
|---|---|---|---|---|
| 8,471,175 B2* | 6/2013 | Finn | ................... | B23K 26/0838 |
| | | | | 219/121.67 |
| 2009/0212033 A1* | 8/2009 | Beck | ................. | B23K 26/0846 |
| | | | | 219/121.72 |

FOREIGN PATENT DOCUMENTS

| | | |
|---|---|---|
| EP | 2 420 344 A1 | 2/2012 |
| FR | 2 532 217 A1 | 3/1984 |
| FR | 2 807 683 A3 | 10/2001 |
| WO | 97/08376 A1 | 3/1997 |
| WO | 2010/140071 A1 | 12/2010 |

OTHER PUBLICATIONS

Written Opinion Corresponding to PCT/IB2014/000145 mailed Jun. 20, 2014.
International Preliminary Report on Patentability Corresponding to PCT/IB2014/000145 mailed Dec. 9, 2014.

* cited by examiner

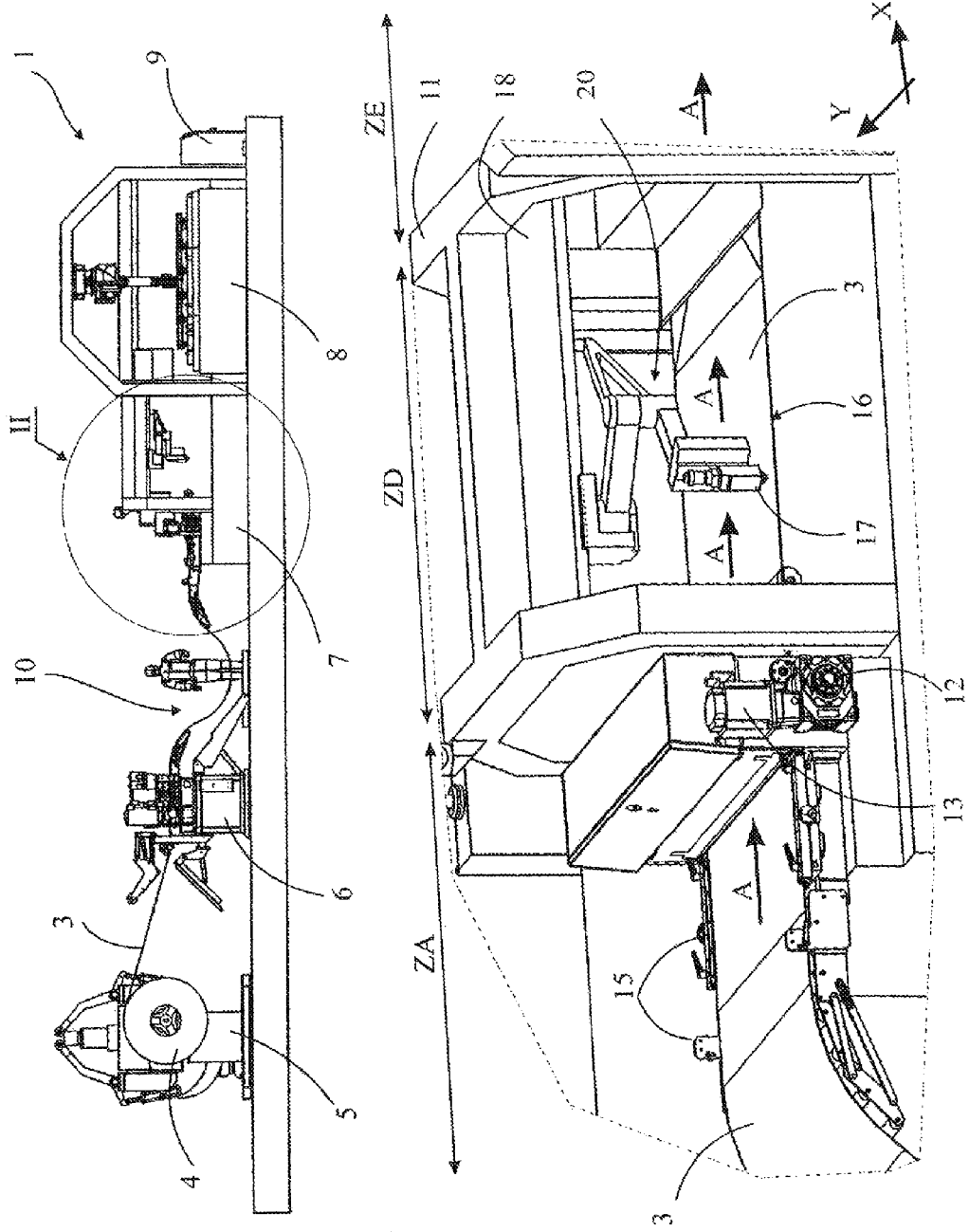

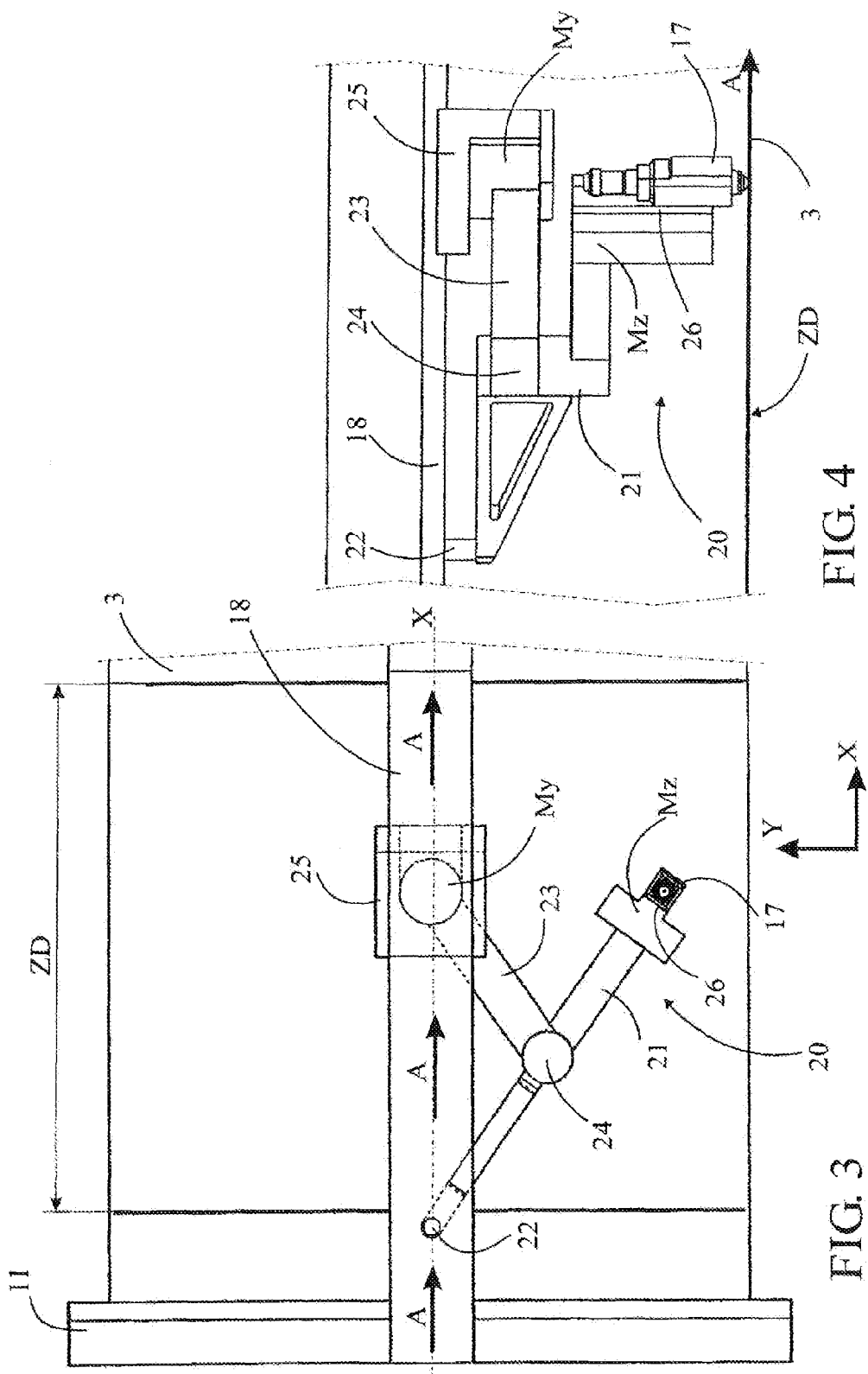

METHOD FOR CUTTING PIECES FROM A STRIP OF MATERIAL AND CUTTING MACHINE FOR CARRYING OUT SAID METHOD

TECHNICAL SCOPE

This invention relates to a method for cutting pieces from a strip of material wound in a coil wherein one unwinds continuously said strip of material to move it in a same direction of movement at a predetermined speed, one cuts said pieces as said strip of material moves continuously using a cutting head that is moved linearly in an orthonormal plane parallel to said strip of material, along a transversal axis and along a longitudinal axis that corresponds to the direction of movement of said strip of material, both linear movements being combined to move said cutting head along any path contained in said orthonormal plane, and one evacuates said parts after cutting.

This invention also relates to a cutting machine carrying out said method and comprising a frame provided with a cutting zone arranged to receive said strip of material, a cutting head supported by a mobile support arranged to move said cutting head linearly in an orthonormal plane parallel to said cutting zone, along a transversal axis and along a longitudinal axis that corresponds to the direction of movement of the strip of material, a feed zone located upstream of said cutting zone and an evacuation zone located downstream of said cutting zone, said feed zone comprising at least one motorized roller coupled with an actuator arranged to move said strip of material in a same direction of movement at a predetermined speed, said mobile support being translatably mounted on a longitudinal beam fastened onto said frame and parallel to said longitudinal axis, and said mobile support comprising a first actuator arranged to move said cutting head linearly along said longitudinal axis.

PRIOR ART

Cutting machines for strip metals wound on a coil are based on the association of an unwinding line and of a cutting table on which the strip of material is introduced in well distinct sequences, in a first machine configuration, the cutting head has a longitudinal and transversal movement that covers the surface of the cutting table to carry out cuts according to any profile. The cutting method consists in unwinding a length of material strip to feed the cutting table, stopping the unwinding of the strip of material, then cutting the parts on a stationary strip section. Then, the cut parts are evacuated either by the forward movement of the strip of material for the following cycle or by directly picking the parts vertically from the cutting table with a manipulator. This first machine configuration imposes discontinuous mode operation between the movement, cutting and unloading phases. This discontinuous mode therefore generates long complete cycle times because of the unloading and forward movement phases for the following cycle, Publications WO 2010/140071 and EP 1 584 407 illustrate cutting machine examples in which the movement of the strip of material is intermittent.

In a second machine configuration, continuous forward movement of the strip of material is combined with pieces cutting. Publication FR 2 807 683 shows a first machine example in which the cutting head moves exclusively perpendicularly to the movement of the strip of material to cover the width of the strip of material in this configuration, the feeding rollers of the strip of material move from the front to the rear to allow cutting pieces according to any contour. This machine therefore requires a buffer zone to absorb the back and forth movements of the strip of material that is not tensioned. In this second machine configuration, the back movement of the strip of material implies, among others, the recirculation of the partly cut strip in the feeding rollers. The cutting operation generates metal particles that pollute this feed zone and damage the produced parts. Moreover, this back-and-forth operating mode is detrimental to the moving mechanical elements and the motors, as it requires strong operating paces that cause premature fatigue. Therefore, this continuous process is not satisfying Publication EP 2 420 344 shows a second machine example combining continuous movement, in a same direction and at a constant speed of the strip of material and the cutting of the pieces. However, the cutting of the parts is carried out by three laser beam cutting heads, each being mobile in an orthonormal plane XY and each defining a work zone, so that the three work zones overlap partially to cover the width of the strip of material. Moreover, the conveyor is divided into three parallel conveyors that correspond to the three cutting zones, defining each an opening arranged vertically below the cutting heads and moved simultaneously to allow the passage of the laser beam. This configuration is constraining, complex, expansive, and does not provide the flexibility required to manufacture any kind of pieces.

Publication FR 2 532 217 describes a laser beam perforating apparatus equipped with a speed sensor for the movement of the material strip, to control the laser beam and impose a constant repetition pitch of the cuts, as well as an identical shape of the cuts. This cutting machine configuration allows no flexibility to control the cutting head and the strip of material that would allow cutting any type or pieces, and generates consequent raw material waste.

Finally, publication WO 97/08376 describes an old cutting technique using a laser beam moved by means of mobile mirrors to cut identical pieces according to a predefined pattern. The control of the mobile mirrors is a technology that is very difficult to master and is not adapted for industrial production with controlled costs, that must show high flexibility and reactivity allowing to cut any type of requested pieces.

DESCRIPTION OF THE INVENTION

The present invention aims to offer a solution for the problems mentioned above by offering a cutting method that is efficient and fast, flexible and offering productivity gains, combining continuous movement of the strip of material, always in the same direction, and the cutting of pieces according to any contour during this movement, method wherein the pieces can be nested in the width of the strip to reduce notably the raw material waste as well as the length of the cutting machine, therefore allowing to obtain a more compact machine, with reduced manufacturing costs, that can be integrated easily in an automated production line for flatbed cutting of pieces from a strip of material wound in a coil.

To that purpose, the invention relates to a method for cutting of the kind described in the preamble, wherein the movement stroke of said cutting head in the transversal axis covers the width of the strip of material, wherein one determines the path of the cutting head according to the contour of said pieces to be cut so as to nest said pieces to be cut in the width of the strip of material, and wherein one synchronizes the movement speed of said cutting head and the movement speed of said strip of material according to said path determined for the cutting head.

Preferably, the movement stroke of said cutting head in the longitudinal axis delimits the length of a cutting zone wherein the cutting operation of the strip of material is carried out during its continuous movement.

The movement speed of said strip of material is preferably continuous and modulated according to the contour of the parts to be cut.

Also to that purpose, the invention relates to a cutting machine of the kind described in the preamble, wherein said mobile support comprises a second actuator arranged to move said cutting head linearly along said transversal axis covering the width of the strip of material, and wherein said machine comprises moreover a central control unit arranged to control said actuators in order to move said cutting head in said cutting zone along any path included in the cutting zone, said path being determined according to the contour of the pieces to be cut in order to nest said parts to be cut in the width of the strip of material, and the movement of said cutting head being synchronized with the movement speed of said material strip.

In a first embodiment, the mobile support comprises a variable-geometry mechanism. This variable-geometry mechanism can comprise on the one hand a rigid arm that supports at a first end said cutting head and at a second end a free pivot that slides in said longitudinal beam, and on the other hand a motorized arm having a length equal to half the length of said rigid arm and whereof a first end is coupled to a central point of said rigid arm by means of a joint and a second end is coupled to said second actuator, said second end of the motorized arm being integral with an horizontal carriage translatably mounted on said longitudinal beam and coupled to said first actuator.

In a second embodiment, the mobile support comprises a stationary-geometry mechanism. This stationary-geometry mechanism can comprise a first sliding carriage mounted in the longitudinal beam and coupled to the first actuator to move the cutting head along the longitudinal axis, and a transversal beam perpendicular to the longitudinal beam, fastened on said first carriage and supporting a second sliding carriage coupled to the second actuator to move the cutting head along the transversal axis.

The longitudinal beam advantageously extends parallel above said cutting zone, on at least the whole length of said cutting zone, and coincides with the longitudinal median axis of said cutting zone. Likewise, the mobile support has advantageously such a span that the cutting head covers at least the whole width of the cutting zone. In this case, said transversal beam has advantageously a length that exceeds the width of said cutting zone.

The cutting head can be integral with a vertical carriage translatably mounted on an end of said mobile support and coupled to a third actuator arranged to move said cutting head perpendicularly to said cutting zone. In this case, the central control unit can also control the third actuator during the cutting operation.

The cutting machine can also comprise at least one measuring sensor arranged to transmit in real time to said central control unit at least the position and the movement speed of said strip of material, this measuring sensor can be made of a measuring wheel positioned in rolling contact on said strip of material upstream of said feed zone.

This machine is advantageously completed with lateral guiding means for said strip of material, located upstream of said feed zone.

BRIEF DESCRIPTION OF THE DRAWINGS

The present invention and its advantages will be better revealed in the following description of an embodiment given as a non limiting example, in reference to the drawings in appendix, in which:

FIG. 1 represents a front view of a production line for pieces cut from a strip of material prepared on a coil up to the evacuation of said parts after cutting, FIG. 2 is a perspective view of detail II of FIG. 1 showing the feed zone and the cutting zone of the cutting machine according to the invention, FIG. 3 is a top view of the cutting zone of FIG. 2, FIG. 4 is a front view of the cutting zone of FIG. 2.

ILLUSTRATIONS OF THE INVENTION AND VARIOUS WAYS OF REALIZING IT

Figures 5, 6:
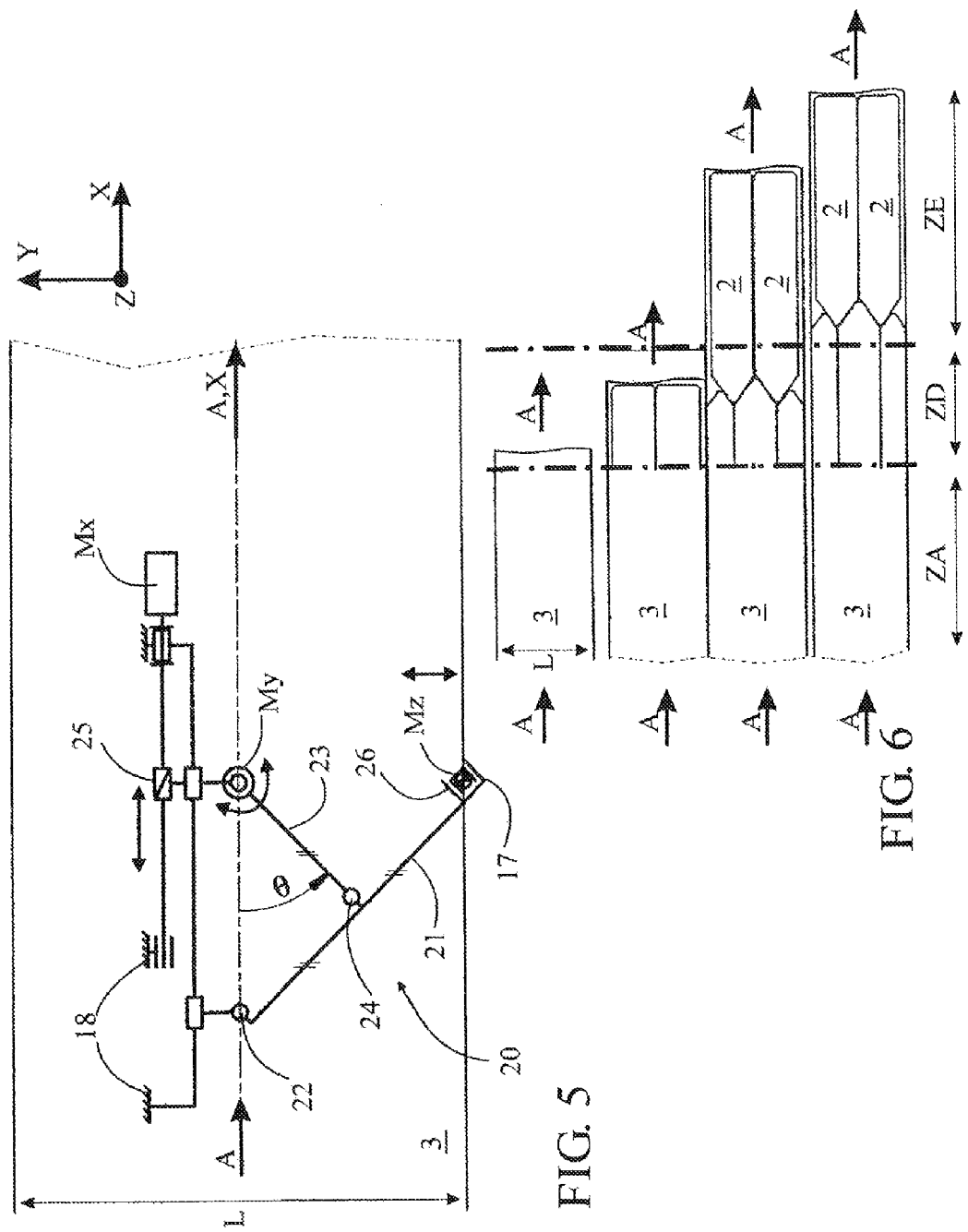
FIG. 5 is a schematic diagram of the kinematics of the mobile support supporting the cutting head according to the invention.
FIG. 6 is a top view of a section of a strip of material in various progress stages in the cutting zone.

This invention can apply to different cutting techniques, in particular thermal cutting by means of oxygen cutting, plasma, laser or similar. The laser cutting technique is the most common, as it allows obtaining a fast cut, with high accuracy in the range of $1/10^{th}$ of a millimeter, with a relatively economical equipment. Cutting includes both cutting and drilling of pieces. Likewise, cutting is not limited to metal pieces but it extends to any other piece cut from a strip of material prepared in a coil, such as a woven, non-woven, synthetic, composite, wood, cardboard, paper or similar material.

FIG. 1 shows an example of a complete production line 1 that allows manufacturing parts 2 (see FIG. 6) that are flatbed-cut from a strip of material 3 prepared in a coil 4. To that purpose, production line 1 comprises an unwinding machine 5 arranged to carry coil 4 and unwind continuously the strip of material 3 of coil 4, followed by a straightening machine 6 arranged to straighten the strip of material 3 before it enters a cutting machine 7 arranged to cut pieces 2 according to a defined contour. Depending on the case, it is possible to combine stamping and thermal cutting by adding a stamping station. An unloading machine 8 can be provided at the exit of the line to evacuate and pack pieces 2 after cutting. A central control unit 9 allows programming and controlling the whole production line. To ensure continuous and stressless feeding of cutting machine 7, production line 1 is provided with a buffer zone 10 arranged between straightening machine 6 and cutting machine 7, wherein the strip of material 3 forms a more or less high, free and untensioned loop.

This invention concerns mainly cutting machine 7, which is designed to cut pieces 2 as the strip of material 3 moves forward continuously, cutting occurring preferably by means of a thermal method. To that purpose, it includes a frame 11 carrying, in the direction of the movement of strip of material 3, a feed zone ZA, a cutting zone ZD and an evacuation zone ZE that can coincide with unloading machine 8. Feed zone ZA comprises for example two superposed driving rollers 12, one being a motorized roller and the other a pressure roller, the motorized roller being coupled to a rotary actuator 13 controlled by central control unit 9 to move strip of material 3 at a continuous movement speed in the direction of movement represented by arrows A. A measuring sensor 14 (see FIG. 7), for example in the form of a coding wheel rolling on strip of material 3, is provided upstream of the driving rollers 12 and is arranged to communicate in real time the position and movement speed of strip of material 3 to central control unit 9 in order to control in real time the actuators associated with the cutting head, to optimize its path and movements, as described below. Guiding means 15 are provided upstream of driving rollers 12 to guide strip of material 3 laterally before it enters cutting zone ZD and thus ensure its accurate axial positioning and, consequently, highly-accurate cutting.

Cutting zone ZD comprises a work table 16 arranged to transport synchronously, freely and without slipping strip of material 3 during its continuous movement. This work table 16 can comprise pins or similar that ensure the transport of strip of material 3, and it can be punched or perforated to allow the evacuation by suction of the dust, molten metal particles and/or smokes linked with the cutting operation. To that purpose, work table 16 is connected to a (non represented) suction unit.

Cutting zone ZD comprises a cutting head 17 supported by a mobile support 20, 40 translatably mounted on a longitudinal beam 18 integral with frame 11. This longitudinal beam 18 with axis X extends parallel above cutting zone ZD and preferably in its median axis, parallel to the direction of movement A of strip of material 3. It supports a first actuator Mx arranged to move linearly mobile support 20, 40, and therefore cutting head 17, along a longitudinal axis X, in en orthonormal coordinate system XYZ parallel to the direction of movement A of strip of material 3.

This mobile support 20 comprises, according to a first embodiment illustrated in FIGS. 2 to 5, a variable-geometry mechanism coupled with a second actuator My arranged to move cutting head 17 along a transversal axis Y perpendicular to longitudinal axis X. This variable-geometry mechanism comprises on the one hand a rigid arm 21 that supports at a first end cutting head 17 and at a second end a pivot 22 that slides freely in said longitudinal beam 18 along a longitudinal axis X, and on the other hand a motorized arm 23 having a length equal to half the length of rigid arm 21 coupled at a first end to a central point of rigid arm 21 by means of a joint 24 and at a second end to the second actuator My. The variation of angle θ formed by motorized arm 23 and longitudinal axis X due to the rotation of actuator My leads to the linear displacement of cutting head 17 in a transversal axis Y as a result of the equal lengths of the lever arms that form said variable-geometry mechanism. More specifically, the length of motorized arm 23 is equal to the length of the half rigid arm 21 that extends between pivot 22 and joint 24 and to the length of the half rigid arm 21 that extends between joint 24 and cutting head 17. So, the combination of both actuators Mx and My allows moving cutting head 17 according to any path in a plane XY parallel to cutting zone ZD. To that purpose, the length of rigid arm 21, as well as the length of longitudinal beam 18, are determined in such a way that the stroke of cutting head 17 will be sufficient to cover the whole surface of cutting zone ZD both on the transversal Y axis and on the longitudinal X axis. In particular, the transversal stroke of rigid arm 21 covers the whole width L of strip of material 3 to best optimize the use of strip of material 3 and reduce raw material waste.

The second actuator My can be a motor driving directly the second end of motorized arm 23 in rotation by means of a positive coupling or similar. This second end of motorized arm 23 is moreover integral with a horizontal carriage 25 translatably mounted in longitudinal beam 18 and coupled to said first actuator Mx. This actuator Mx can, as in the schematic diagram illustrated in FIG. 5, be a motor driving horizontal carriage 25 in translation by means of a transmission of the pinion/rack, worm/nut or of a similar type. Of course, any other transmission or actuator, such as a cylinder or similar, can be suitable.

Figure 8:
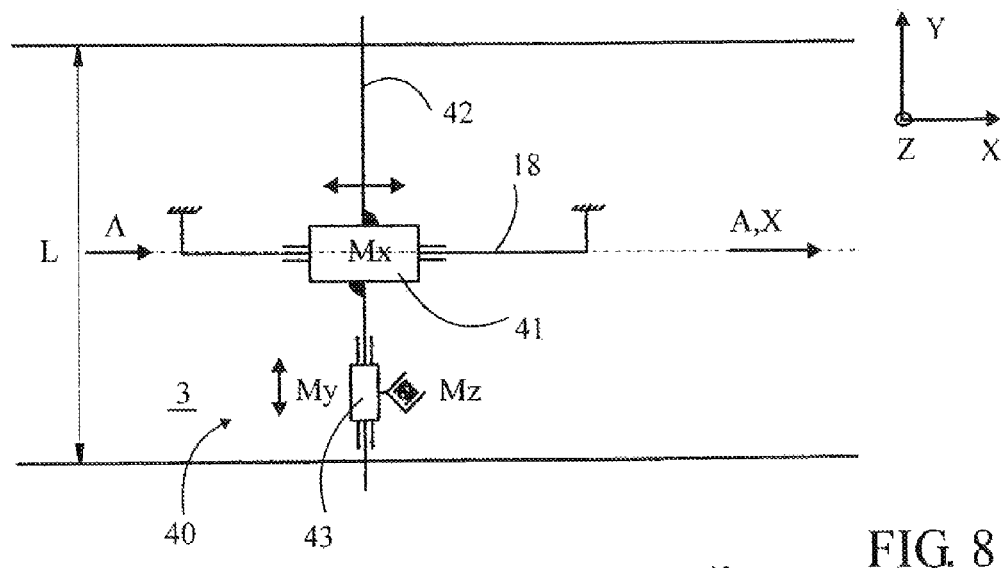
FIG. 8 is a schematic diagram of the kinematics of the mobile support supporting the cutting head according to an embodiment variant of the invention.
Figure 9:
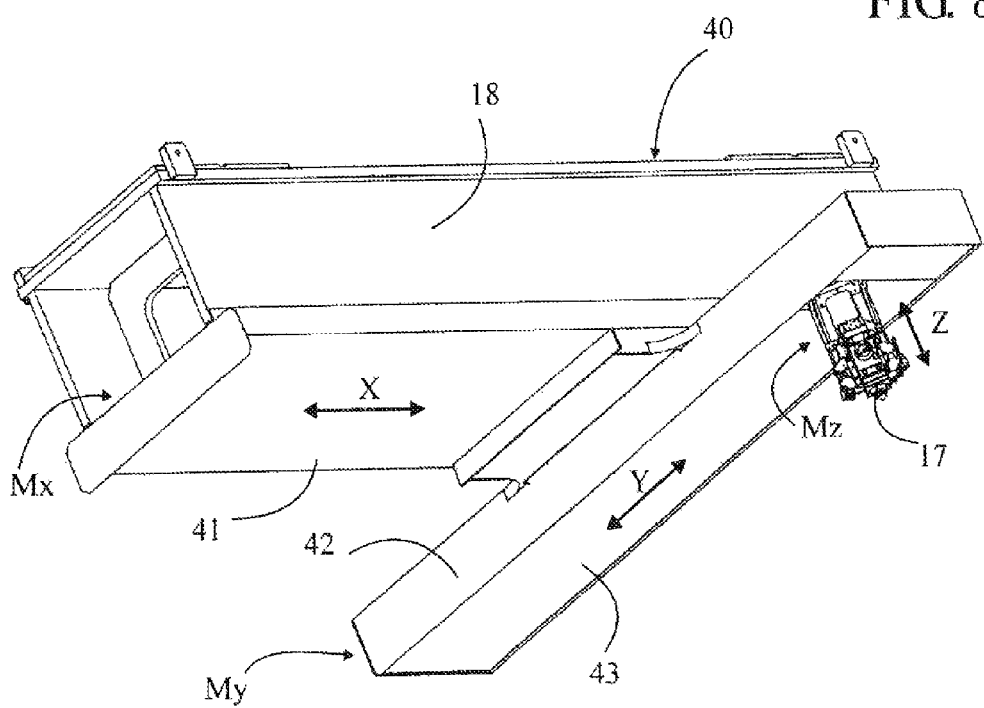
FIG. 9 is a simplified bottom view of the mobile support of FIG. 8.

This mobile support 40 can also comprise, according to a second embodiment illustrated in FIGS. 8 and 9, a stationary-geometry mechanism comprising a second actuator My arranged to move cutting head 17 along a transversal axis Y perpendicular to longitudinal axis X. This stationary-geometry mechanism comprises a first sliding carriage 41 mounted in longitudinal beam 18 and coupled to actuator Mx to move cutting head 17 along longitudinal axis X. It moreover comprises a transversal beam 42, perpendicular to longitudinal beam 18, fixed on first sliding carriage 41 and carrying a second sliding carriage 43 coupled to actuator My to move cutting head 17 along transversal axis Y. So, the combination of both actuators Mx and My allows moving cutting head 17 according to any path in a plane XY parallel to cutting zone ZD. To that purpose, the length of transversal beam 42, as well as the length of longitudinal beam 18, are determined in such a way that the stroke of cutting head 17 will be sufficient to cover the whole surface of cutting zone ZD both on the transversal Y axis and on the longitudinal X axis. For this reason, the length of transversal beam 42 projects from both sides of width L of strip of material 3 in order for the transversal stroke of the second sliding carriage 42 to cover the whole width L of strip of material 3, allowing to best optimize the use of strip of material 3 and reduce raw material waste. This second embodiment has the advantage of being mechanically simpler.

The first and second actuators Mx and My are advantageously linear motors allowing accurate and fast control of sliding carriages 41, 43, without mechanical transmission. In this case, the longitudinal 18 and transversal 42 beams form the stators and the sliding carriages 41, 43 form the rotors. Of course any other actuator can be suitable, such as rotary motors driving in translation respectively the first and second sliding carriages 41, 43 by means of a transmission of the pinion/rack, worm/nut or of a similar type, cylinders or similar.

Cutting head 17 is moreover integral with a vertical carriage 26 translatably mounted along a vertical axis Z at the first end of rigid arm 21. It is coupled to a third actuator Mz arranged to move cutting head 17 perpendicularly to cutting zone ZD. This actuator Mx can be a motor driving vertical carriage 26 in translation by means of a transmission of the pinion/rack, worm/nut type or any other equivalent means.

The central control unit 9 thus allows controlling these three actuators Mx, My, Mz in combination and synchronized with actuator 13 of feed zone ZA to move cutting head 17 along a path in two or three dimensions that will allow it to cut, as the strip of material 3 moves forward continuously, the contour of the pieces 2 to be cut in the width of strip of material 3. Depending on the required contour, cutting can be performed continuously or in several operations. The used actuators can be servomotors that allow fast and very accurate response.

The original design of cutting machine 7 according to the invention allows nesting pieces 2 to be cut in the width of strip of material 3 in order to achieve raw material savings and productivity gains. FIG. 6 allows illustrating an example of the nesting of pieces 2 to be cut, as well as the progress of the cutting operation at various stages of the movement of strip of material 3 in direction A. Thus FIG. 6 presents a top view of a strip of material 3 in four stages of its movement. Starting from the top of FIG. 6, at the first stage of the movement, the strip of material 3 arrives from feed zone ZA in cutting zone ZD. At the second stage of the movement, cutting head 17 starts its cutting work on the section of strip of material 3 entering cutting zone ZD. At the third stage of the movement, cutting head 17 continues its cutting work as strip of material 3 passes through cutting zone ZD, nesting the contours of the pieces 2 to be cut in order to optimize the use of the raw material, and strip of material 3 enters evacuation zone ZE. At the fourth stage of the movement, cutting head 17 continues its cutting work as strip of material 3 passes through cutting zone ZD and the first cut pieces 2 have left cutting zone ZD and are located in evacuation zone ZE, where they can be removed by any known means, manual, semi-automatic, automatic such as a robot arm. The residual waste is evacuated simultaneously with the cut pieces 2.

Figure 7:
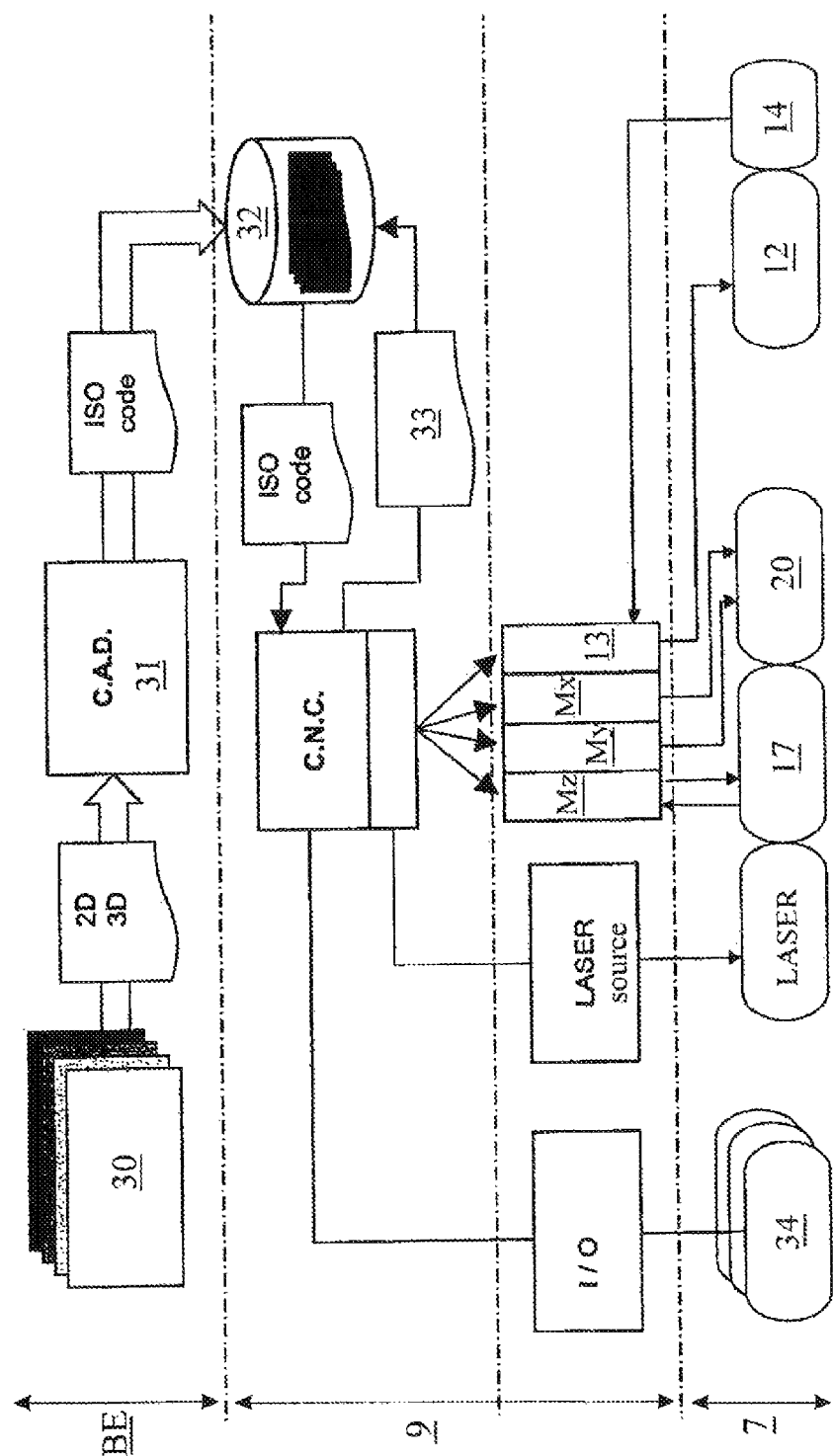
FIG. 7 is a flow chart of the implementation of the cutting method according to the invention.

FIG. 7 represents as a flow chart the steps of the industrial process that allows producing pieces 2 cut on the basis of manufacturing plans 30 designed in two dimensions 2D in a design office or in three dimensions 3D with the help of computer-aided design (CAD) computer tools 31. These manufacturing, plans 30 are codified and saved in a server 32. They are then converted in files 33 usable for a CNC computer for the numerical control of actuators Mx, My, Mz and 13 of cutting machine 7, this computer being integrated in central control unit 9. This CNC computer will also control the operation of the cutting tool according to the cut to be performed, for example a laser beam, as well as the further equipment 34 of cutting machine 7 such as the suction. Sensors allow real-time transmission to the CNC computer of certain data of cutting machine 7 in order to optimize the control and synchronization of the actuators, such as the speed of the movement of strip of material 3 by means of a measuring sensor 14, the vertical position of cutting head 17, etc.

POSSIBILITIES FOR INDUSTRIAL APPLICATION

The cutting machine 7 according to the invention integrates perfectly in an industrial line producing flatbed-cut pieces. It applies to all cutting techniques, in particular thermal ones, and allows reaching the goals defined, that is to say a machine able to cut pieces in a strip of material running at a continuous speed, always in the same direction, this machine being compact, economical, requiring only two actuators Mx and My to perform the cutting of the pieces in the plane defined by cutting zone ZD, ensuring high cutting accuracy, high cutting flexibility, allowing even customized work, for optimized efficiency, with a substantial reduction of raw material waste.

The present invention is not restricted to the examples of embodiment described, but extends to any modification and variant which is obvious to a person skilled in the art while remaining within the scope of the protection defined in the attached claims.

The invention claimed is:

1. A method for cutting pieces (2) from a strip of material (3) wound in a coil, the method comprising:
   unwinding continuously the strip of material (3) to move the strip in a same direction of movement (A) at a predetermined speed,
   cutting the pieces as the strip of material moves continuously using a cutting head (17) that is moved linearly in an orthonormal plane (XY) parallel to the strip of material, along a transverse axis (Y) and along a longitudinal axis (X) that corresponds to the direction of movement (A) of the strip of material, both linear movements (X-Y) being combined to move the cutting head (17) along any path contained in the orthonormal plane (XY), and
   evacuating the parts after cutting,
   wherein the movement stroke of the cutting head (17) in the transverse axis (Y) covers the width (L) of the strip of material, wherein the path of the cutting head (17) is determined according to the contour of the pieces (2) to be cut so as to nest the pieces (2) to be cut in the width (L) of the strip of material (3), the movement speed of the cutting head (17) and the movement speed of the strip of material (3) according to the path determined for the cutting head (17) are synchronized, and the movement speed of the strip of material (3) is continuous and modulated according to the contour of the parts (2) to be cut.

2. The method according to claim 1, further comprising the step of delimiting a cutting zone (ZD) via the movement stroke of the cutting head (17) in the longitudinal axis (X), and carrying out the cutting operation of the strip of material (3) during continuous movement.

3. A cutting machine (17) carrying out the cutting method for cutting pieces (2) from a strip of material (3) wound in a coil, the method comprising: unwinding continuously the strip of material (3) to move the strip in a same direction of movement (A) at a predetermined speed, cutting the pieces as the strip of material moves continuously using a cutting head (17) that is moved linearly in an orthonormal plane (XY) parallel to the strip of material, along a transverse axis (Y) and along a longitudinal axis (X) that corresponds to the direction of movement (A) of the strip of material, both linear movements (X-Y) being combined to move the cutting head (17) along any path contained in the orthonormal plane (XY), and evacuating the parts after cutting, wherein the movement stroke of the cutting head (17) in the transverse axis (Y) covers the width (L) of the strip of material, wherein the path of the cutting head (17) is determined according to the contour of the pieces (2) to be cut so as to nest the pieces (2) to be cut in the width (L) of the strip of material (3), the movement speed of the cutting head (17) and the movement speed of the strip of material (3) according to the path determined for the cutting head (17) are synchronized, and the movement speed of the strip of material (3) is continuous and modulated according to the contour of the parts (2) to be cut,
   the machine comprising: a frame (11) provided with a cutting zone (ZD) arranged to receive the strip of material (3), a cutting head (17) supported by a mobile support (20, 40) arranged to move the cutting head (17) linearly in an orthonormal plane parallel to the cutting zone (ZD), along a transverse axis (Y) and along a longitudinal axis (X) that corresponds to the direction of movement (A) of the strip of material, a feed zone (ZA) of the strip of material (3) located upstream of the cutting zone and an evacuation zone (ZE) of the cut pieces (2) located downstream of the cutting zone, the feed zone (ZA) comprising at least one motorized roller (12) coupled with an actuator (13) arranged to move the strip of material (3) in a same direction of movement (A) at a predetermined speed, the mobile support (20, 40) being translatably mounted on a longitudinal beam (18) fastened onto the frame (11) and parallel to the longitudinal axis (X), and the mobile support (20, 40) comprising a first actuator (Mx) arranged to move the cutting head (17) linearly along the longitudinal axis (X), wherein the mobile support (20, 40) comprises a second actuator (My) arranged to move the cutting head (17) linearly along the transverse axis (Y) covering the width (L) of the strip of material (3), and the machine comprises moreover a central control unit (9) arranged to control the actuators (13, Mx, My) in order to move the cutting head (17) in the cutting zone (ZD) along any path included in the cutting zone (ZD), the path being determined according to the contour of the pieces (2) to be cut in order to nest the parts (2) to be cut in the width (L) of the strip of material (3), and the movement of the cutting head (17) being synchronized with the movement speed of the material strip (3), which is modulated according to the contour of the parts (2) to be cut.

4. The machine according to claim 3, wherein the mobile support (20) comprises a variable-geometry mechanism.

5. The machine according to claim 4, wherein the variable-geometry mechanism of mobile support (20) comprises, on the one hand, a rigid arm (21) that supports at a first end the cutting head (17) and at a second end a free pivot (22) that slides in the longitudinal beam (18), and, on the other hand, a motorized arm (23) having a length equal to half the length of the rigid arm (21) and whereof a first end is coupled to a central point of the rigid arm (21) by a joint (24) and a second end is coupled to the second actuator (My), the second end of the motorized arm (23) is integral with an horizontal carriage (25) translatably mounted on the longitudinal beam (18) and coupled to the first actuator (Mx).

6. The machine according to claim 3, wherein the mobile support (40) comprises a stationary-geometry mechanism.

7. The machine according to claim 6, wherein the stationary-geometry mechanism of mobile support (40) comprises a first sliding carriage (41) mounted in the longitudinal beam (18) and coupled to the first actuator (Mx) to move the cutting head (17) along the longitudinal axis (X), and a transverse beam (42) perpendicular to the longitudinal beam (18), fastened on the first sliding carriage (41) and supporting a second sliding carriage (43) coupled to the second actuator (My) to move the cutting head (17) along the transverse axis (Y).

8. The machine according to claim 3, wherein the longitudinal beam (18) extends parallel above the cutting zone (ZD), on at least a whole length of the cutting zone (ZD), and coincides with the longitudinal median axis of the cutting zone (ZD).

9. The machine according to claim 8, wherein the mobile support (20, 40) has a span so that the cutting head (17) covers at least a whole width (L) of the cutting zone.

10. The machine according to claim 9, wherein the transverse beam (42) has a length that exceeds the width (L) of the cutting zone.

11. The machine according to claim 3, wherein the cutting head (17) is integral with a vertical carriage (26) translatably mounted on an end of the mobile support (20, 40) and coupled to a third actuator (Mz) arranged to move the cutting head (17) perpendicularly to the cutting zone (ZD), and the central control unit (9) also controls the third actuator (Mz) during the cutting operation.

12. The machine according to claim 3, wherein the machine comprises at least one measuring sensor (14) arranged to transmit, in real time to the central control unit (9), at least the position and the movement speed of the strip of material (3).

13. The machine according to claim 12, wherein the measuring sensor is made of a measuring wheel positioned in rolling contact on the strip of material (3) upstream of the feed zone (ZA).

14. The machine according to claim 1, wherein the machine comprises lateral guiding means (15) for the strip of material (3) located upstream of the feed zone ZA).

* * * * *